United States Patent [19]

Nordström

[11] Patent Number: 4,966,403

[45] Date of Patent: Oct. 30, 1990

[54] ARRANGEMENT FOR SUSPENSION OF A DOOR ON A VEHICLE BODY

[75] Inventor: Orvar Nordström, Trollhättan, Sweden

[73] Assignee: Saab-Scania Aktiebolag, Sweden

[21] Appl. No.: 335,056

[22] Filed: Apr. 7, 1989

[30] Foreign Application Priority Data

Apr. 11, 1988 [SE] Sweden ............................... 8801314

[51] Int. Cl.[5] ......................... B62D 25/10; E05F 1/08

[52] U.S. Cl. ...................................... 296/76; 296/202; 16/289; 49/386

[58] Field of Search .................... 296/56, 146, 202, 76; 16/1 C, 289, 293; 220/335; 49/386

[56] References Cited

U.S. PATENT DOCUMENTS

| | | | |
|---|---|---|---|
| 2,686,340 | 8/1954 | Shepard et al. | 16/289 X |
| 2,800,361 | 7/1957 | Kubacka | 296/76 |
| 3,870,287 | 3/1975 | McMahon | 267/64.11 X |
| 3,963,227 | 6/1976 | Molders | 296/56 X |
| 4,118,131 | 10/1978 | Schnitzius | 296/56 X |
| 4,776,626 | 10/1988 | Seyler | 296/76 |
| 4,788,747 | 12/1988 | Ludwig | 267/64.26 X |

FOREIGN PATENT DOCUMENTS

| | | | |
|---|---|---|---|
| 1241723 | 10/1970 | Fed. Rep. of Germany . | |
| 1939377 | 2/1971 | Fed. Rep. of Germany . | |
| 2151935 | 4/1973 | Fed. Rep. of Germany . | |
| 2223208 | 11/1973 | Fed. Rep. of Germany | 296/76 |
| 3413229 | 10/1985 | Fed. Rep. of Germany . | |
| 1444214 | 5/1965 | France | 296/56 |
| 0291216 | 12/1986 | Japan | 296/76 |
| 706939 | 4/1954 | United Kingdom . | |
| 754776 | 8/1956 | United Kingdom . | |
| 758330 | 10/1956 | United Kingdom . | |
| 769620 | 3/1957 | United Kingdom . | |
| 783576 | 12/1957 | United Kingdom . | |
| 1364778 | 8/1974 | United Kingdom . | |
| 2008511 | 6/1979 | United Kingdom . | |
| 1571018 | 7/1980 | United Kingdom . | |

*Primary Examiner*—Dennis H. Pedder
*Attorney, Agent, or Firm*—Ostrolenk, Faber, Gerb & Soffen

[57] ABSTRACT

An arrangement for suspension of a door, preferably a luggage compartment door, on a vehicle body. Between the vehicle body and the door there are arranged separate first and second spring elements. The attachment points of the second spring element, during the first part of the pivoting movement of the door from a closed to an open position, exerts a torque in a direction counter to the pivoting movement and, during the continued pivoting movement of the door, exerts a torque in the direction of the pivoting movement.

9 Claims, 1 Drawing Sheet

ARRANGEMENT FOR SUSPENSION OF A DOOR ON A VEHICLE BODY

Figure 1:
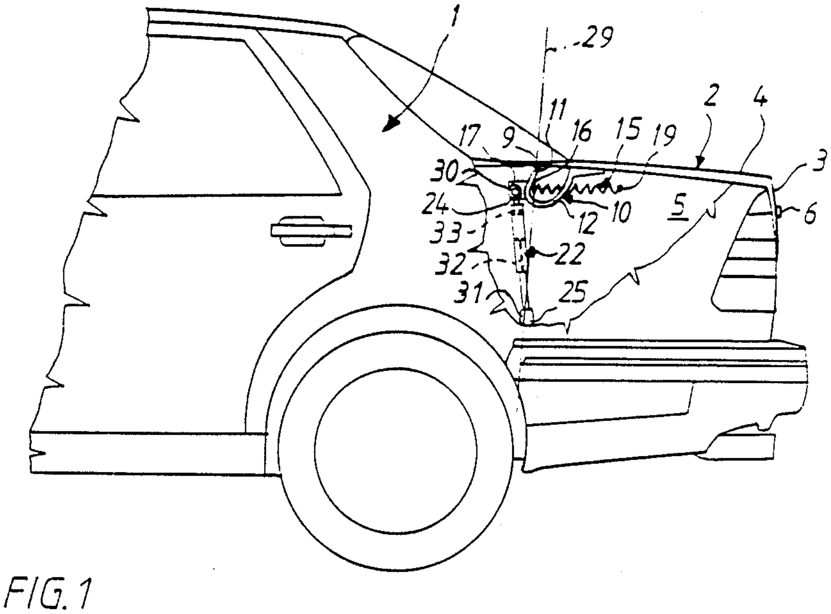

The present invention relates to an arrangement for suspension of a door, preferably a luggage compartment door, on a vehicle body, which door is pivotable about a pivot axle between a closed and an open position, there being arranged between the door and the vehicle body at least one first spring element which, during the pivoting movement of the door from the closed to the open position, exerts a torque in the direction of the opening movement.

The luggage compartment door of a car is often heavy, and a not inconsiderable force is required to open it.

In order to facilitate the opening of the door and to ensure that the door is maintained in the open position, it is known to arrange a helical spring, pneumatic spring or the like between the door and the vehicle body.

Such a spring is arranged and dimensioned such that, upon opening of the door, it exerts a torque in the direction of the opening movement, which torque counteracts the torque which the door, by reason of its weight, gives rise to and which attempts to shut the door.

In known solutions of the type in question, use is made of a comparatively powerful spring, which is designed so that the torque acting in the direction of the opening movement is greater than the torque which attempts to shut the door. This is regarded as being necessary in order to ensure that the door can be opened and maintained in the open position even when the car is parked on, for example, an uphill slope.

Known solutions have a number of disadvantages, of which it may be mentioned that the spring, as a result of the greater torque, tends to open the door as soon as its lock is opened, and that the opening movement of the door, again as a result of the greater torque, takes place relatively quickly and in an uncontrolled manner and only comes to a stop after the door has bounced a number of times against an end-position stop.

The aim of the present invention is to eliminate the abovementioned disadvantages. To this end, the invention provides at least one second spring element which is arranged between the door and the vehicle body, the attachment points of the second spring element being geometrically chosen such that the second spring element, during the first part of the opening movement of the door, exerts a torque in a direction counter to the opening movement and, during the continued opening movement of the door, exerts a torque in the direction of the opening movement.

The attachment points of the second spring element are geometrically chosen such that the spring element exerts a torque in the direction counter to the opening movement when the door is closed, which prevents the door from swinging up as soon as its lock is opened.

When the door is opened by hand from its closed position, the second spring element swings with the door so that its upper attachment point passes through a line between the pivot axle of the door and the lower attachment point of the spring element, after which the spring element exerts a torque in the direction of the opening movement, which facilitates continued opening of the door.

In an advantageous embodiment of the invention, the second spring element is made up of a pneumatic spring which comprises an end-position damper which reduces the projection speed of the pneumatic spring piston when the piston approaches its extreme end-position.

Since the piston of a pneumatic spring has a specific projection speed, the opening movement of the door takes place at a controlled speed. In the event of a provoked opening speed, the speed is slowed down by the pneumatic spring.

When the door reaches its fully open position, the opening speed is slowed down by the end-position damper of the pneumatic spring, in which respect rebounding of the door is counteracted.

Figure 2:
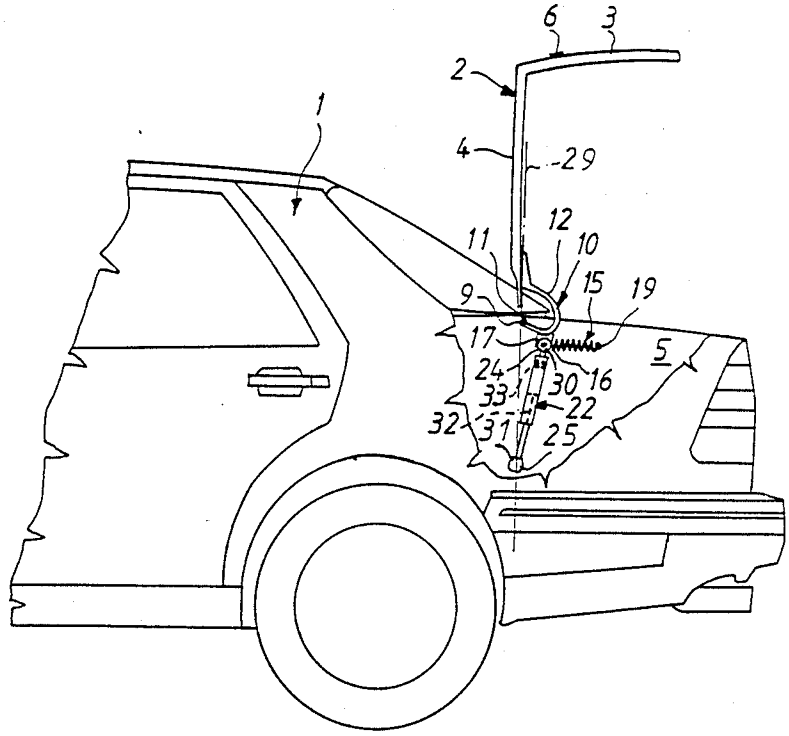

Other features characterizing the invention emerge from the subsequent patent claims and from the following description of an exemplary embodiment of the invention, in which description reference is made to the attached figures in which FIG. 1 shows an arrangement according to the invention on a car with a closed luggage compartment door and FIG. 2 shows an arrangement according to the invention on a car with an open luggage compartment door.

FIG. 1 shows the rear part of a vehicle with a body 1 on which a luggage compartment door 2 is arranged.

The door 2 is designed with a transverse rear panel 3 which at the top merges into a slightly sloping upper part 4 and is dimensioned in such a way that, when in the normal closed position, it covers a luggage compartment 5 formed in the vehicle and thereafter, with a smooth transition, connects to the body 1. The door 2 is locked in a position covering the luggage compartment 5 by means of a door lock 6 arranged in the rear panel 3.

The door 2 is pivotable to an upright position opening the luggage compartment 5, which position is shown in FIG. 2. The pivoting movement takes place about a horizontally transverse pivot axle 9 and is made possible by two hinge element 10 which are situated at a distance from each other and of which only one is shown in the figures.

Each hinge element 10 consists of a butt hinge bearing 11 which is secured on the body 1 and of a butt hinge arm 12 which is connected to the butt hinge bearing 11. The butt hinge bearing 11 thus defines the pivot axle 9 of the door.

The butt hinge arm 12 is bent downwards in an arch and is secured to the door 2 by screws (not shown) or the like.

In order to facilitate the pivoting movement of the door 2 from a closed to an open position, a first spring element, preferably a helical spring 15, is arranged on at least the one hinge element 10.

The helical spring 15 extends horizontally in the longitudinal direction of the vehicle and is arranged and dimensioned in such a way that, upon opening of the door, it exerts a torque in the direction of the opening movement.

One end 16 of the helical spring 15 is fixed in a bracket 17 at that end of the butt hinge arm 12 directed towards the bearing 11. The bracket 17 is arranged so that the attachment point of the helical spring 15 is located in front of and below the pivot axle 9 of the door 2 when the door 2 is closed.

The other end 19 of the helical spring 15 is fixed, in a manner not shown in detail, in a bracket on the body 1 behind the pivot axle 9 of the door 2 so that the helical spring 15 is in an elongated and stretched state when the door is shut (FIG. 1), but in a compressed unstretched state when the door is open (FIG. 2).

In order to permit a controlled pivoting movement of the door 2, at least one second compression spring element 22 is arranged between the door 2 and the body 1.

The spring element 22 is advantageously made up of a pneumatic spring which comprises an end-position damper 33 which reduces the projection speed of the pneumatic spring piston 32 when the piston 32 approaches its extreme end-position.

The pneumatic spring is arranged in an essentially vertical position between the door 2 and the body 1 when the door 2 is shut. Its one end 24 is rotatably mounted on a bracket 17 with a ball joint 30 (not shown in detail), while its other end 25 is rotatably mounted on the body 1 at the bottom part of the luggage compartment 5 with a ball joint 31 (again not shown in detail). That end 24 of the pneumatic spring mounted on the bracket 17 is situated in front of the pivot axle 9 of the door 2 when the door 2 is shut.

The pneumatic spring is further dimensioned so as to exert on the helical spring 15 a force whose magnitude is 10–15% of the force which the helical spring 15 exerts on the door 2. In the embodiment described here, the pneumatic spring exerts a force of between 80 and 100 N.

The arrangement according to the invention has the following function.

The procedure for opening the door 2 is initiated by the door lock 6 shown in FIG. 1 being opened. As a result of the fact that the helical spring 15 is in an elongated stretched state, the spring 15 exerts a torque which attempts to open the door 2 as soon as the lock 6 is opened.

The door 2 thus tends to swing upwards about its pivot axle 9. However, the pivoting movement is counteracted by the pneumatic spring which exerts a torque on the door 2 about its pivot axle 9, which torque is directed counter to the torque which the helical spring 15 exerts in order to force the door 2 towards its open position.

In order to be able to continue opening of the door 2, force must be exerted on it by hand. The door 2 then pivots upwards about its pivot axle 9. During the pivoting movement, the bracket 17 arranged towards the butt hinged arm 12, and with it the pneumatic spring, pivots downwards and backwards in an arched path so that its upper attachment point passes through a line 29 between the pivot axle 9 of the door 2 and the lower attachment point of the pneumatic spring.

After it has passed the line 29, the pneumatic spring forces the door 2 towards its open position and imparts to the helical spring 15 an additional force which facilitates continued opening of the door 2.

Since the piston 32 of the pneumatic spring has a specific projection speed, the pivoting movement of the door 2 from a closed to an open position takes place at a controlled speed. In the event of provoked speed, the speed is slowed down by the pneumatic spring.

Immediately before the door 2 reaches its fully open position, its opening speed is slowed down by the end-position damper 33 of the pneumatic spring, by which means rebounding of the door 2 is counteracted when it reaches its end-position.

Upon closing the door 2, a force is exerted, preferably on the rear panel 3 of the door 2, which force gives rise to a downward-directed torque about the pivot axle 9, which torque is greater than the sum of the upward-directed torque which attempts to maintain the door in the open position. The door 2 then pivots downwards about the pivot axle 9. During the pivoting movement the pneumatic spring pivots in such a way that its upper attachment point again passes through the line 29 between the pivot axle 9 of the door and the lower attachment point of the pneumatic spring. When the pneumatic spring has passed the line 29 during the closing movement, it forces the door 2 towards its closed position and ensures that the door 2 is closed properly.

The invention should not be regarded as being limited to the embodiment described, but can be modified within the scope of the subsequent patent claims in a number of alternative embodiments.

I claim:

1. A suspension system, comprising:

(A) a body;

(B) a door which is connected to the body at a pivot axis, the door having a closed position, an intermediate position and an open position, the door being pivotable about the pivot axis in an opening angular direction from the closed position to the intermediate position and then to the open position, the door being pivotable about the pivot axis in a closing angular direction, the closing angular direction being opposite to the opening angular direction;

(C) a tension spring with a first end and a second end, the first end being connected to the body, the second end being connected to the door, the tension spring pulling the door in the opening angular direction when the door is in the closed position, the tension spring pulling the door in the opening angular direction when the door is in the intermediate position; and (D) a pneumatic compression spring with a first end and a second end, the first end of the pneumatic compression spring being connected to the body, the second end of the pneumatic compression spring being connected to the door, the pneumatic compression spring pushing the door in the closing angular direction when the door is in the closed position, the second end of the pneumatic compression spring being located directly between the pivot axis and the first end of the pneumatic compression spring when the door is in the intermediate position, the pneumatic compression spring pushing the door in the opening angular direction when the door is in the open position, the pneumatic compression spring including an end position damper for reducing the speed at which the door approaches the open position.

2. The suspension system of claim 1, wherein the tension spring is essentially horizontal, the compression spring being essentially vertical.

3. The suspension system of claim 2, wherein the door includes a hinge element, the hinge element being connected to the body at the pivot axis, the hinge element including a bracket which is spaced apart form the pivot axis, the second end of the tension spring and the second end of the compression spring being connected to the bracket.

4. The suspension system of claim 3, wherein the hinge element is bent downward from the pivot axis in an arch, the bracket being located near the bottom of the arch.

5. The suspension system of claim 3, wherein the tension spring is a helical spring.

6. The suspension system of claim 5, wherein the compression spring exerts a force of about 80–100 newtons.

7. The suspension system of claim 3, wherein the ends of the compression spring are pivotably connected to the bracket and to the body by ball joints.

8. A vehicle, comprising:

(A) a vehicle body with a luggage compartment;

(B) a door for closing the luggage compartment, the door being connected to the body at a pivot axis, the door having a closed position, an intermediate position and an open position, the door being pivotable about the pivot axis in an opening angular direction from the closed position to the intermediate position and then to the open position, the door being pivotable about the pivot axis in a closing angular direction, the closing angular direction being opposite to the opening angular direction;

(C) a tension spring with a first end and a second end, the first end being connected to the body, the second end being connected to the door, the tension spring pulling the door in the opening angular direction when the door is in the closed position, the tension spring pulling the door in the opening angular direction when the door is in the intermediate position; and (D) a pneumatic compression spring with a first end and a second end, the first end of the pneumatic compression spring being connected to the body, the second end of the pneumatic compression spring being connected to the door, the pneumatic compression spring pushing the door in the closing angular direction when the door is in the closed position, the second end of the pneumatic compression spring being located directly between the pivot axis and the first end of the pneumatic compression spring when the door is in the intermediate position, the pneumatic compression spring pushing the door in the opening angular direction when the door is in the open position, the pneumatic compression spring including an end position damper for reducing the speed at which the door approaches the open position.

9. The vehicle of claim 8, wherein the tension spring is essentially horizontal, the compression spring being essentially vertical.

* * * * *